United States Patent [19]

Tacke et al.

[11] 4,281,621
[45] Aug. 4, 1981

[54] TIRE SEALANT APPLICATOR

[75] Inventors: Kenneth L. Tacke, Woodinville; Lyle D. Galbraith; Hudson Stewart, both of Kirkland, all of Wash.

[73] Assignee: Rockcor, Inc., Redmond, Wash.

[21] Appl. No.: 99,570

[22] Filed: Dec. 3, 1979

Related U.S. Application Data

[60] Division of Ser. No. 933,579, Aug. 14, 1978, Pat. No. 4,206,008, which is a continuation of Ser. No. 745,194, Nov. 26, 1976, abandoned.

[51] Int. Cl.³ ............................................. B05B 13/06
[52] U.S. Cl. .................................. 118/500; 118/306; 118/318; 198/786; 427/233
[58] Field of Search .................... 15/53 B; 34/21, 58, 34/104, 105, 106; 51/103, 105, 106, 216, 215, 281, 227, DIG. 33; 81/15.2, 15.5, 15.6, 15.7; 118/52, 55, 302, 306, 318, 500; 141/38; 156/115; 157/1; 193/35 R, 38 R, 37, 41; 198/523, 525, 620, 624, 671, 780, 786, 796; 401/99; 427/230, 231, 233, 236

[56] References Cited

U.S. PATENT DOCUMENTS

| Re. 14,765 | 12/1919 | Urbach | 118/318 |
|---|---|---|---|
| 1,420,371 | 6/1922 | Emmons | 34/104 |
| 1,471,787 | 10/1923 | Gammeter | 118/318 |
| 1,474,654 | 11/1923 | Urbach | 118/318 |
| 2,088,542 | 7/1937 | Westin | 118/319 |
| 2,534,362 | 12/1950 | Magnuson | 198/786 |
| 2,597,930 | 5/1952 | Grosvenor | 198/786 |
| 2,700,624 | 1/1955 | Wagner et al. | 118/58 |
| 2,872,740 | 2/1959 | Schaevitz | 34/68 |
| 3,311,085 | 3/1967 | Smith | 118/50 |
| 3,463,293 | 8/1969 | Lederer | 198/786 |
| 3,825,965 | 7/1974 | Root | 118/318 |
| 3,849,819 | 11/1974 | Sullivan et al. | 118/72 |
| 3,962,907 | 6/1976 | Brandl | 118/318 |
| 3,977,358 | 8/1976 | Stroobants | 118/318 X |

Primary Examiner—John E. Kittle
Attorney, Agent, or Firm—Dowrey & Cross

[57] ABSTRACT

The applicator includes two elongated conveyor rollers arranged in parallel alignment and inclined from a sealant application station toward a tire unloading station. The rollers simultaneously rotate a series of tires in the same direction about a common axis in side-by-side engagement with one end tire adjacent the sealant application station and the other end tire adjacent the unloading station. A kicker assembly unloads the latter end tire, whereupon the rollers advance the remaining tires toward the unloading station while maintaining coaxial rotation thereof. A fresh tire then may be positioned at the application station and the application and advancement steps repeated. The applicator further includes a sealant applicator for effecting airless spray application of sealant to a tire, together with a control system for controlling the position of the spray applicator and causing sealant to be purged a predetermined time after no sealant application is made. The applicator is suited for usage in a system for producing self-healing tires.

8 Claims, 10 Drawing Figures

TIRE SEALANT APPLICATOR

This is a division of application Ser. No. 933,579, filed Aug. 14, 1978 which is a continuation of application Ser. No. 745,194 filed Nov. 26, 1976, now abandoned.

BACKGROUND OF THE INVENTION

This invention relates to systems and methods for producing self-healing tires and to tire sealant applicators suited for use therewith.

Self-healing tires typically include a sealant or air barrier composition which is applied to the tire interior by spray application to the interior tire surfaces underlying the tread area, usually with gradual feathering into the sidewalls. Until this invention, however, tires of this type were fabricated using uneconomical application techniques which did not afford automatic or mass production treatment of a large number of tires. Consequently, in many practical cases, sealant application to tires of this type was effected manually, or on an essentially piecemeal basis, or both. More specifically, application of commercial tire sealants customarily was accomplished by first rotating the tire past a stationary sealant applicator at an application station, and then transporting the tire to a curing station at which the tire was rotated for a sufficient time to allow the sealant to set-up while evaporating solvent therefrom, if any.

Early examples of these and other tire application apparatus of this type are disclosed in U.S. Pat. Nos. 1,471,787; 1,474,654 and U.S. Pat. No. Re. 14,765, although all of the aforementioned patents pertain to fabrication of self-lubricating tube-type tires instead of modern tubeless self-healing tires. More recent examples of various tire treatment apparatus and methods especially suited for cleaning tubeless tires in preparation for sealant application, or application of fluid air barrier coatings, are disclosed in U.S. Pat. Nos. 3,825,965 and 3,849,819. With the exception of the aforementioned U.S. Pat. No. 1,474,654, the apparatus and methods disclosed in the aforementioned patents accomplish sealant application on a piecemeal basis. U.S. Pat. No. 1,474,654 offers simultaneous rotation of several tires at various stages of treatment; however, the tires are conveyed from treatment station to treatment station in end-to-end coplanar alignment and, therefore, in most practical applications in which production space is limited, the number of tires which can be treated at one time is effectively limited, depending upon a number of tires which can be accommodated by existing production space end-to-end.

SUMMARY OF THE INVENTION

This invention provides a system and method for producing self-healing tires, and a tire sealant applicator suited for use therewith. The applicator of this invention affords simultaneous fabrication of a plurality of self-healing tires on an economical basis by simultaneously rotating a series of tires about a common axis during sealant application and cure.

According to one preferred embodiment of the invention, the applicator includes two elongated conveyor rollers arranged in parallel alignment and inclined from a sealant application station toward a tire unloading station. The rollers simultaneously rotate a series of tires about a common axis with one end tire adjacent a tire sealant application station and the other end tire adjacent a tire unloading station. Following unloading of the latter end tire, the rollers advance each tire toward the unloading station while maintaining coaxial rotation thereof so that, upon arrival at a predetermined position of advancement, preferably the unloading station, sealant applied to each tire is properly cured and distributed. After each tire advancement, a fresh tire may be positioned at the application station and the application and advancement steps repeated. According to further aspects of the invention, the tires are rotated coaxially in side-by-side engagement with one another and, in this way, form a coaxial passageway through which air flow can be established in order to extract evaporating solvent produced during the sealant curing process.

In one preferred embodiment of the invention, the applicator further includes a movable sealant applicator for effecting airless spray application of sealant to a tire, together with a control system for controlling the position thereof. While preferably the tires are unloaded automatically by a kicker assembly and fresh tires are positioned manually at the application station, either or both operations could be effected automatically or manually, as the case may be, for use in a fully or partially automated fabrication of self-healing tires.

In a system for producing self-healing tires, this invention utilizes the aforementioned tire sealant applicator in combination with tire cleaning means. The system further may include appropriate heating means for heating the tires before, or after, or both before and after, sealant application, depending upon the type of sealant used, temperature conditions and other factors.

Thus it will be appreciated from the foregoing summary that this invention provides a highly versatile yet economic tire sealant applicator which, in combination with appropriate cleaning means, or cleaning means and heating means, provides a highly economical system and method for producing self-healing tires.

One tire sealant with which the applicator of this invention may be used is made up of a sealant component and a catalyst component which, when combined, yield an evaporating solvent which is effectively removed utilizing the aforementioned coaxial gas passage formed by the tires. It will be recognized that this invention may be used with other types of sealants, some of which may or may not require removal of evaporated solvent. In those instances in which the two component sealant utilized further requires that one component thereof be heated prior to combination with the second component thereof and, to this end, the applicator of this invention may include an appropriate heat exchanger. For use with the aforementioned two component sealant, the applicator control system of this invention further may include means for effecting automatic purge of the sealant system after a predetermined time during which no sealant application is made.

These and other features, objects and advantages of the present invention will become apparent in the detailed description and claims to follow, taken in conjunction with the accompanying drawings.

DETAILED DESCRIPTION OF THE DRAWINGS

Figure 1:
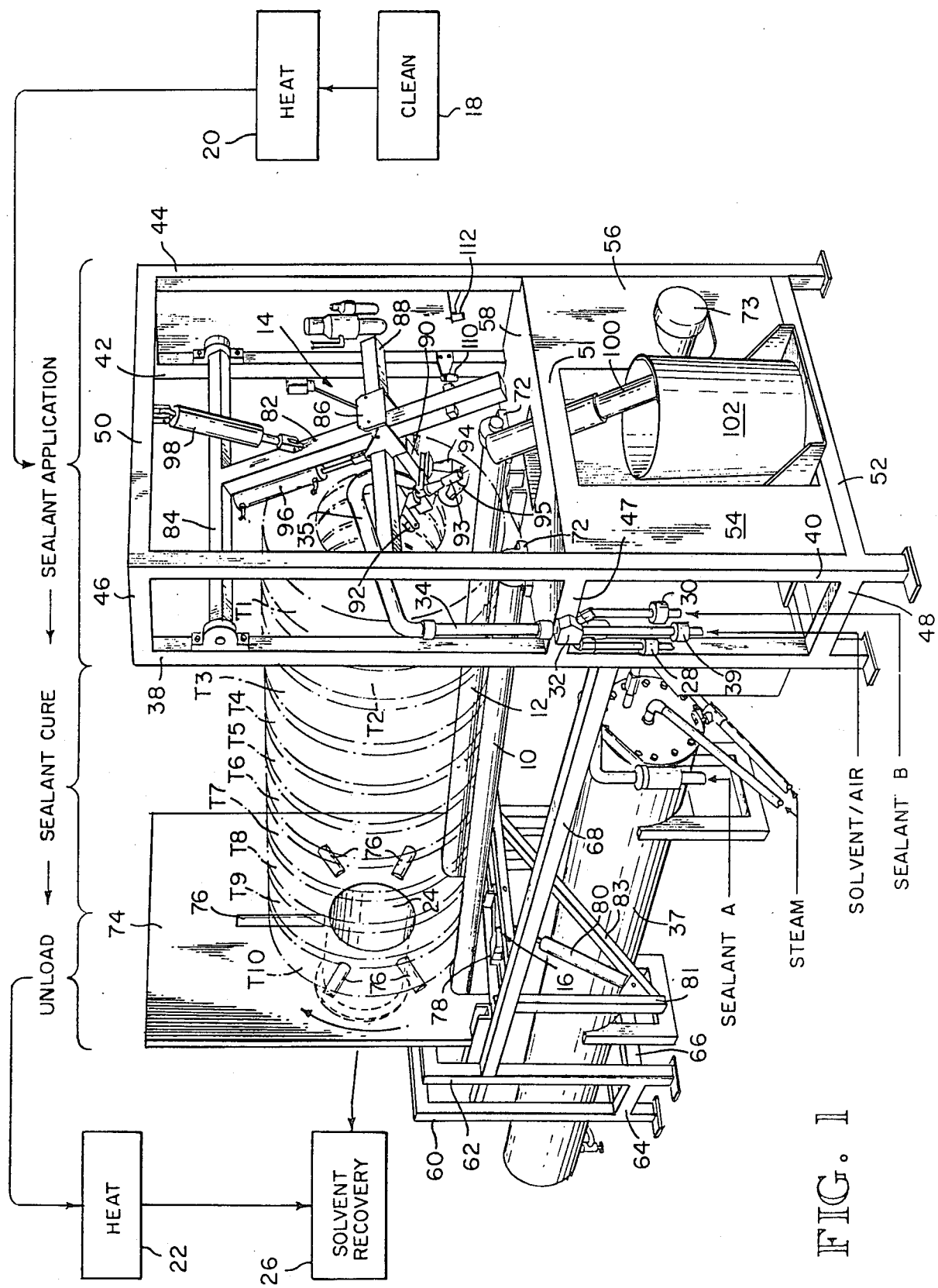
FIG. 1 is a perspective view of the tire sealant applicator of this invention with parts broken away, together with a block diagram representation of the system for producing self-healing tires according to this invention.

The system and method for producing self-healing tires according to this invention, together with the tire sealant applicator for use therewith, are illustrated in FIG. 1 of the drawings. The FIG. 1 applicator provides a sealant application station adjacent one end thereof, a tire unloading station adjacent the other end thereof, and an intervening sealant cure station. The applicator includes two elongated conveyor rollers 10, 12 arranged in parallel alignment and inclined from the application station toward the unloading station. These rollers simultaneously rotate a series of tires (referenced T1–T10 in FIGS. 1, 2) in the same direction about a common axis in side-by-side engagement with one end tire adjacent the application station and the other end tire adjacent the unloading station. A movable sealant applicator (generally referenced by numeral 14) is located adjacent the application station for effecting airless spray application of a suitable tire sealant to end tire T1 during rotation thereof. A movable tire unloader or kicker assembly (generally referenced by numeral 16) is located adjacent the unloading station for unloading end tire T10 by engaging and moving it transversely to the common tire axis out of coaxial alignment with remaining tires T1–T9. Following unloading of tire T10, tires T1–T9 advance in series toward the position previously occupied by tire T10 and in this way make room along side now-advanced tire T1 for loading of a fresh tire adjacent the application station in the position formerly occupied by tire T1. In the example, fresh tires are positioned or loaded manually at the application station, although automatic loading apparatus could be used, if desired.

Thus, it will be appreciated that the sealant applied to the respective tires T1–T10 will be in various stages of set-up or cure, depending upon the position of a certain tire between the sealant application station and the unloading station during passage thereof through the sealant cure station. It is possible, therefore, by unloading tires T1–T10 at predetermined time intervals, to effectively control the time during which each tire is advanced from the sealant application station to the unloading station through the sealant cure station. In the illustrated example, the tires are conveyed from the application station to the unloading station for a time period which is sufficient to allow the sealant applied to set-up or substantially cure and which preferably represents a certain multiple of the time required to effect sealant application and advancement with respect to each tire. In the example, ten tires are treated simultaneously for a period of about ten (10) minutes—sealant application and tire advancement each consuming about thirty (30) seconds elapsed time. In other instances, of course, these time periods could vary, depending upon tire size, sealant application time required, type of sealant and other factors.

In a system for producing self-healing tires, the FIG. 1 applicator may be combined with appropriate tire cleaning apparatus 18 and, if required by the type of cleaning apparatus or sealant used, appropriate pre-heat apparatus 20. For use with liquid cleaning apparatus, the apparatus 20 effects removal of residual water and cleansers from the now cleaned tire in preparation for sealant application. The preheated cleaned tire is thereupon delivered by suitable means to the sealant application station. Upon completion of the aforementioned sealant application, cure and unloading operations, each tire may be delivered to an additional heating apparatus 22, depending upon the condition of the sealant upon completion of the aforementioned operations. In many practical operations, depending upon the type of sealant utilized and the cure time period afforded by the FIG. 1 applicator, supplemental application of heat with continued tire rotation may be necessary. In the latter instance, each tire may be delivered to heating apparatus 22 and maintained under coaxial rotational conditions therein with respect to a series of tires using conveyor rollers generally similar to rollers 10, 12.

In the illustrated example, the applicator additionally maintains the tires in side-by-side engagement, as shown (FIGS. 1, 2), except during the advancement following unloading of end tire T10. During such advancement, the remaining tires T1–T9 undulate transversely and, in effect, "walk" down the inclined rollers 10, 12 toward the unloading station. At other times, therefore, the tires define a coaxial gas passage for axial alignment with duct 24 through which evaporated solvent, if any, may be extracted, discharged and/or recovered by suitable solvent recovery apparatus 26 (FIG. 1). Such solvent recovery additionally may be effected with respect to heating apparatus 22, as indicated schematically.

In the illustrated example, the tire sealant or fluid air barrier is formed by a two component catalyzed sealant, the components being referenced generally in FIG. 1 as sealant A and sealant B. These components are routed via separate control valves 28, 30 and manifold 32 to a mixing chamber 34 in which they are mixed immediately prior to spray application. The now mixed sealant components are then fed by a high pressure hose 35 via spray valve 36 (FIG. 4A) to applicator 14 which effects airless spray application thereof. Following application to the tire interior, the sealant is maintained in position until it gels by centrifugal force produced by tire rotation, thereby yielding a uniform coating inside the tire which does not tend to alter tire balance. The rotational velocity of the tire during such sealant application, of course, should be selected to maintain the sealant in position until it gels and, in the illustrated example, the tire is therefore rotated through multiple revolutions during each spray cycle. Consequently, multiple thin coats of sealant are applied to the tire interior surfaces. Although a two component or two-part sealant is depicted in the illustrated example, it will be recognized that other appropriate sealants or liquid air barriers may be used in this invention, if desired.

Figure 2:
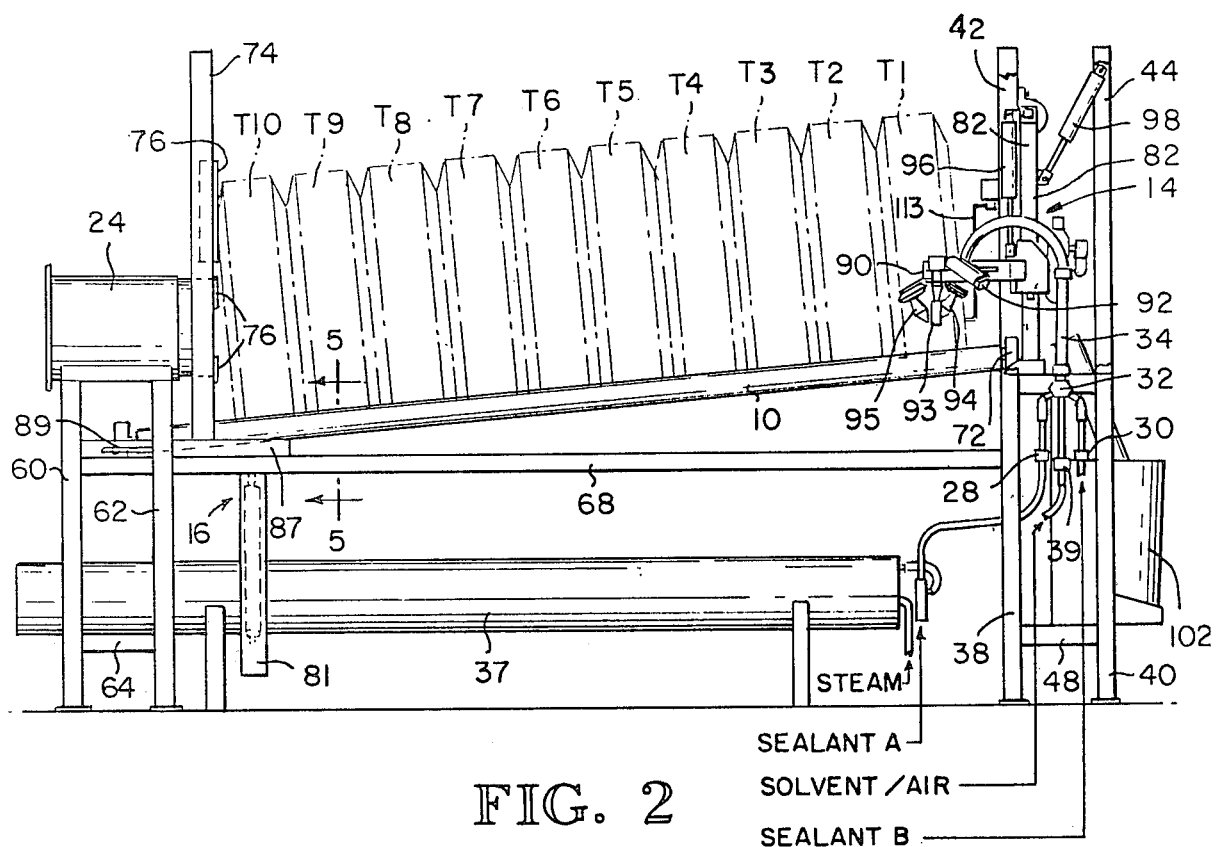
FIG. 2 is a side elevation of the FIG. 1 applicator, with parts broken away.

In those applications in which one or both components of the sealant utilized require application of heat thereto prior to mixing or application thereof to a tire, a heat exchanger or other appropriate heating means may be provided. In the illustrated example, a tubular heat exchanger 37 of conventional design and construction is positioned adjacent the FIG. 1 applicator with its output end adjacent the application station. The illustrated heat exchanger causes heat to be transferred from input steam to sealant component A in conventional fashion. Sealant component A first is delivered under pressure to the heat exchanger input indicated and, following passage through the heat exchanger, is in turn routed to valve 28, as shown (FIG. 2). In those applications requiring solvent and/or air purge, an additional input valve 39 may be provided in communication with manifold 32 for receipt of solvent and/or air for purging the sealant system made up of the manifold 32, mixer 34, hose 34, and applicator 14, as will be described presently.

The applicator of this invention will now be described in additional detail, first with reference to FIGS. 1 and 2. The applicator includes an applicator end section constituted by a supporting end frame structure made up of four vertical corner support members 38, 40, 42, 44; upper, immediate and lower transverse side members 46, 47, 48; upper, immediate and lower transverse end members 50, 51, 52; vertical end panels 54, 56; and horizontal end panel 58, as shown (FIG. 1). The applicator further includes an unloading end section constituted by a second supporting end frame made up of vertical inverted U-shaped members 60, 62; and transverse side and end members 64 and 66. Longitudinal side rails 68, 70 (side rail 70 shown in FIG. 5) connect the aforementioned end frame structures.

Figure 5:
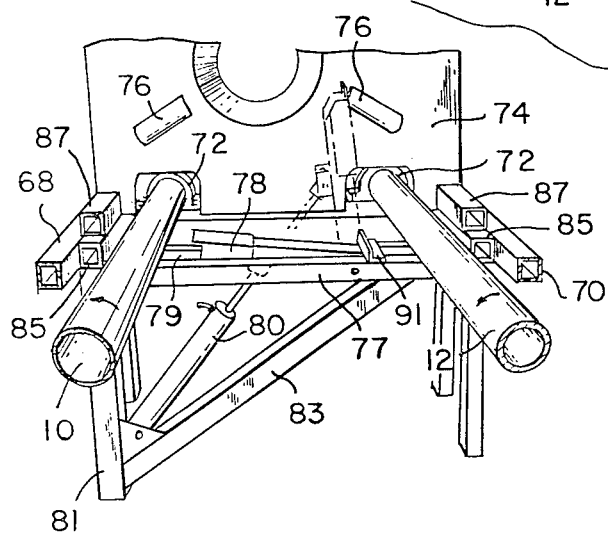
FIG. 5 is a section taken along the line 5—5 in FIG. 2.

The conveyor rollers 10 and 12 are supported rotatively at their ends by respective journal blocks 72 mounted by the aforementioned end frame structures, as shown (FIGS. 1, 5). A variable speed drive motor 73 (FIG. 1) is operatively connected by means not shown to drive roller 10 while roller 12 acts as an idler. The rollers are of sufficient lengths to support and simultaneously rotate a predetermined number of tires, the number depending upon sealant cure or set-up time, sealant application time, tire size, type of the kicker assembly used, and other factors. In a specific practical example, the conveyor rollers are of sufficient length to support and simultaneously rotate ten automotive tires in side-by-side contact in a clockwise direction as indicated by the arrow in FIG. 1. In this example, the conveyor rollers are driven at sufficient rotational velocity that the tires are rotated simultaneously at about 30–40 RPM. For use with a specific sealant which has a gel time of about three to four minutes and which requires the application of about sixteen coats to achieve desirable results, the spray application process with respect to a tire T1 consumes approximately thirty (30) seconds of time. Consequently, upon advancement of the T1 to the position occupied by tire T5 in the drawings, the sealant applied to tire T1 should be set-up or gelled. With continued advancement toward the unloading station, the sealant, of course, will continue to cure and should be substantially or completely cured upon arrival at the unloading station, depending upon temperature, sealant used and other factors. It will be understood, of course, that the FIG. 1 applicator may be utilized with a fewer number of tires while achieving the desired result. The total number of tires which are treated simultaneously by the FIG. 1 applicator, of course, should not cause an excessive force to be applied to the end tire T10 which could tend to overload the kicker assembly.

Still referring to the FIGS. 1 and 2, conveyor rollers 10, 12—in the illustrated example—are inclined about 3° toward the unloading station with respect to horizontal, although this angle may be varied, depending upon the tire size and other factors. For example, if this angle is too small, tire T1 tends to fall backwards against the spray applicator. If this angle is too large, proper alignment and positioning of the applicator 14 could be affected adversely. The roller angle further should be selected to encourage tire undulation during advancement. It will be recognized, of course, that other conveyor means could be utilized to convey the tires from the application station toward the unloading station in order to achieve desired results. For example, the conveyor rollers could be horizontal and utilized in combination with a ram device for applying a force parallel to the common tire axis in a direction toward the unloading station, or one or both rollers could be formed with appropriate auger threads for applying a force to the tires in a direction toward the unloading station, or the rollers could be positioned to divergent relationship to one another proceeding toward the unloading station. The illustrated parallel and inclined roller construction, however, is preferred in many practical applications because that construction prevents or substantially minimizes relative movement between the tires during intervals between tire unloading cycles; yet allows the tires to undulate transversely during tire advancement while preventing or substantially minimizing the likelihood that tire T1 will fall backward against the applicator.

Referring now to FIGS. 1 and 5, the kicker assembly includes a kicker arm 78, one end of which is supported pivotally by transverse members 77, 79 mounted between rails 68, 70 by opposed pairs of mounting members 85, 87 as shown (FIG. 5). A double acting reciprocative actuator 80, preferably a double acting air cylinder, is mounted by members 81, 83 below members 77, 79 for selectively moving the kicker arm. Members 85, 87 are secured to end frame members 60, 62 by slot and pin adjustment 89 (FIG. 2) which permit the kicker assembly to be secured at selected positions along the common tire axis with the kicker arm in underlying relation to tire T10. Members 85, 87 further mount a vertical backplate 74 which includes a central aperture in coaxial communication with duct 24. Duct 24 is supported by end frame members 60, 62, as shown (FIG. 2). The backplate 74 rotatively mounts a plurality of support rollers 76 which are adapted to bear against the face of the adjacent end tire T10. Consequently, the backplate, in combination with the support rollers 76, serves to fix the position of the end tire T10 with respect to the common tire axis, while permitting rotational movement thereof, in order to maintain the tires in their illustrated side-by-side engagement when rotated by rollers 10, 12. To accommodate varying numbers of tires, or tires of varying widths, or both, the positions of the kicker assembly and backplate are adjustable conjointly along the tire axis by adjustment 89 (FIG. 2).

Still referring to FIG. 5, the kicker arm 78 is rotatable by actuator 80 between a horizontal retracted position (depicted in solid lines) and an upright advanced position (depicted in broken lines) at which it engages and is positioned by L-shaped stop 91 mounted by members 77, 79. During movement from its retracted position toward its advanced position, arm 78 engages and lifts the T10 toward roller 12. Tire T10 thereupon rolls over roller 12 and is unloaded. If the direction of rotation of rollers 10, 12 is reversed, of course, the kicker arm should be mounted for pivotal movement about a pivot point adjacent roller 10.

Figure 3:
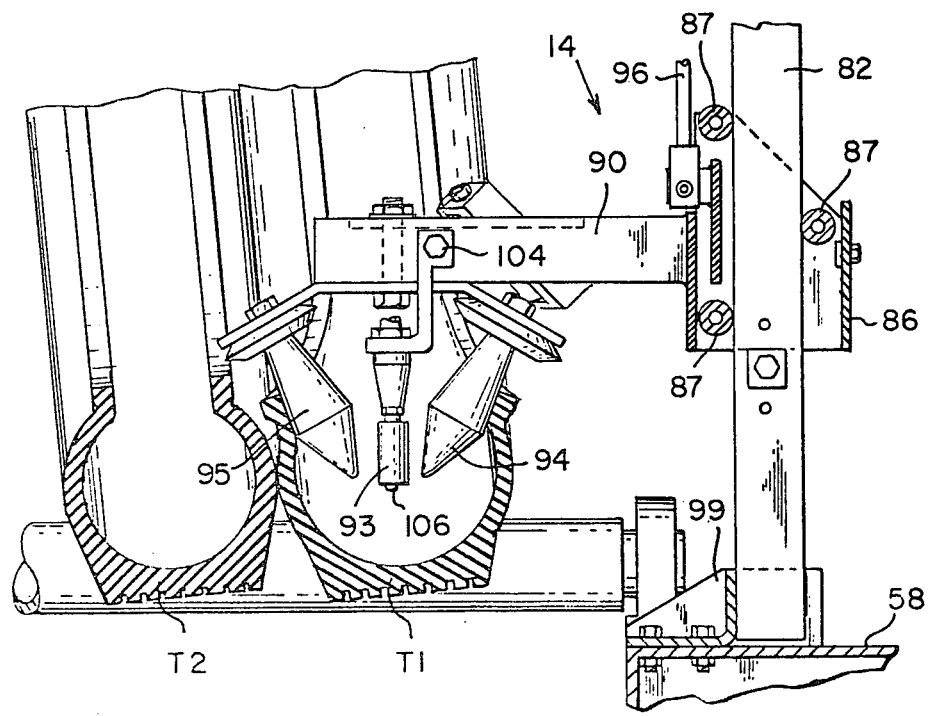
FIG. 3 is a fragmentary side elevation generally similar to FIG. 2 but partially in section and on enlarged scale.
Figure 4A:
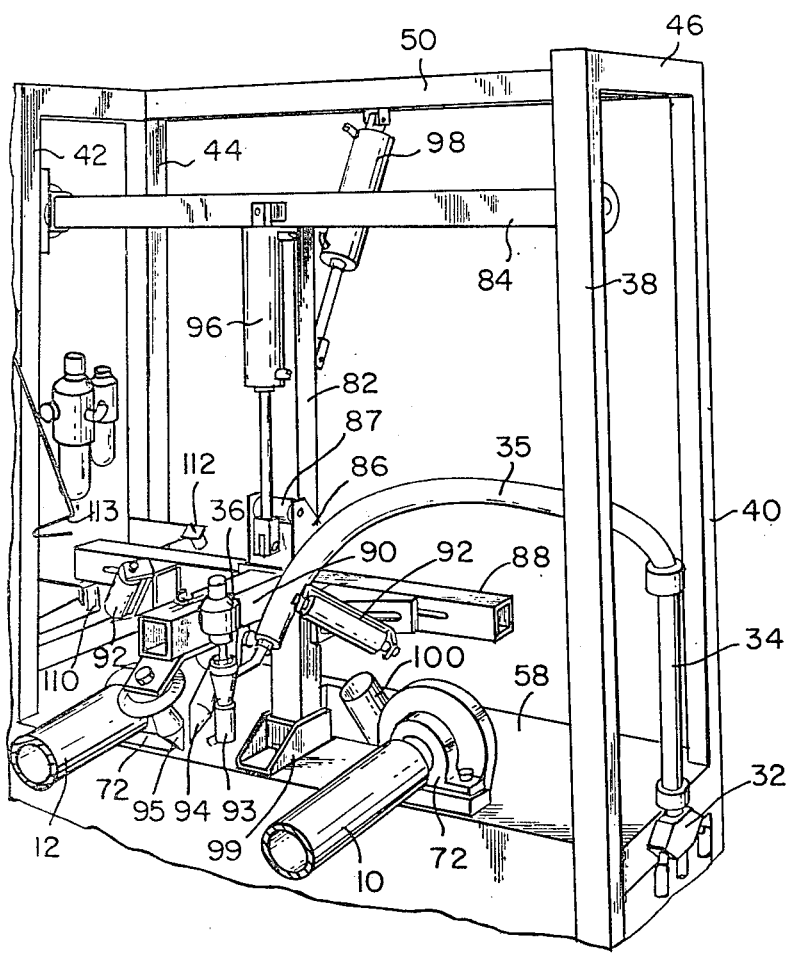
FIG. 4A is a fragmentary perspective on an enlarged scale of the spray applicator of the FIG. 1 applicator, depicting the spray applicator in its lowered advanced application position.

The sealant applicator of this invention will now be described in detail with reference to FIGS. 1, 3 and 4A–4D. Referring first to FIG. 1, the applicator includes a spray arm 82, the upper end of which depends from a transverse pivot member 84, the ends of which are pivotally mounted by frame members 38 and 42, respectively. A carriage assembly 86 is mounted for reciprocative movement with respect to the arm by opposed rollers 87, as shown (FIG. 3). The carriage mounts a transverse roller support arm 88 and a perpendicular nozzle support arm 90. Arm 88 mounts inclined tire positioning rollers 92 (FIG. 4A). Arm 90 mounts a spray applicator 93, together with inclined spreader rollers 94, 95. The carriage assembly is movable reciprocatively with respect to arm 82 by a double acting reciprocative actuator 96 attached between member 84 and assembly 86. The arm 82 is movable pivotally in a vertical plane with respect to the supporting frame (sometimes referred to hereinafter as "sweep" movement) by a double acting reciprocative actuator 98 attached between transverse member 50 and arm 82, as shown (FIG. 1). The actuators 96, 98 are generally similar and preferably are constituted by double acting air cylinders. The applicator assembly is thereby movable between a lowered advanced application position (FIG. 4A), a raised advanced position (FIG. 4B), a raised retracted rest position (FIG. 4C), and a lowered retracted purge position (FIG. 4D). In the FIG. 4A, 4B positions, a U-shaped stop 99 mounted by panel 58 engages and positions the lower end of arm 82. In the FIG. 4D position, the applicator 93 registers with the upper end of an inclined purge tube 100 for purposes of purging the sealant feed system, as will be described presently. The lower end of tube 100 is insertable within an appropriate receptacle 102 for receiving the purge and contents of the applicator via tube 100.

The spray applicator is illustrated in FIG. 3 in its lowered advanced application position. In this position, the spreader rollers 94, 95 engage and spread respective sidewalls of the tire T1. The nozzle 93 is adjustably positionable by adjustable connector 104 at sufficient height from the lower interior surface of the tire in order to obtain the desired sealant distribution. In most practical applications, the nozzle is so positioned that sealant is applied heaviest adjacent the thread area with gradual feathering into the sidewalls of the tire. In the illustrated example, the nozzle effects airless spray application of liquid sealant by ejecting the sealant composition at high pressure against a deflector plate 106. The nozzle height with respect to the tire surface is therefore selected with respect to the spray pattern obtained and may be varied, depending upon tire size, in order to obtain desired sealant distribution. If the nozzle is positioned too high, for example, it tends to spray the tire sidewalls excessively so that, in order to obtain the desired sealant thickness adjacent the tread area, it is necessary to apply uneconomical amounts of sealant. Conversely, if the nozzle is positioned too low, sealant tends to build up adjacent the center of the tread area. It will be recognized, of course, that instead of adjusting the nozzle to accommodate various tire sizes, specific nozzles could be correlated for each tire size and these nozzles substituted for one another and mounted at a corresponding fixed position with respect to the tire surface.

Figure 6:
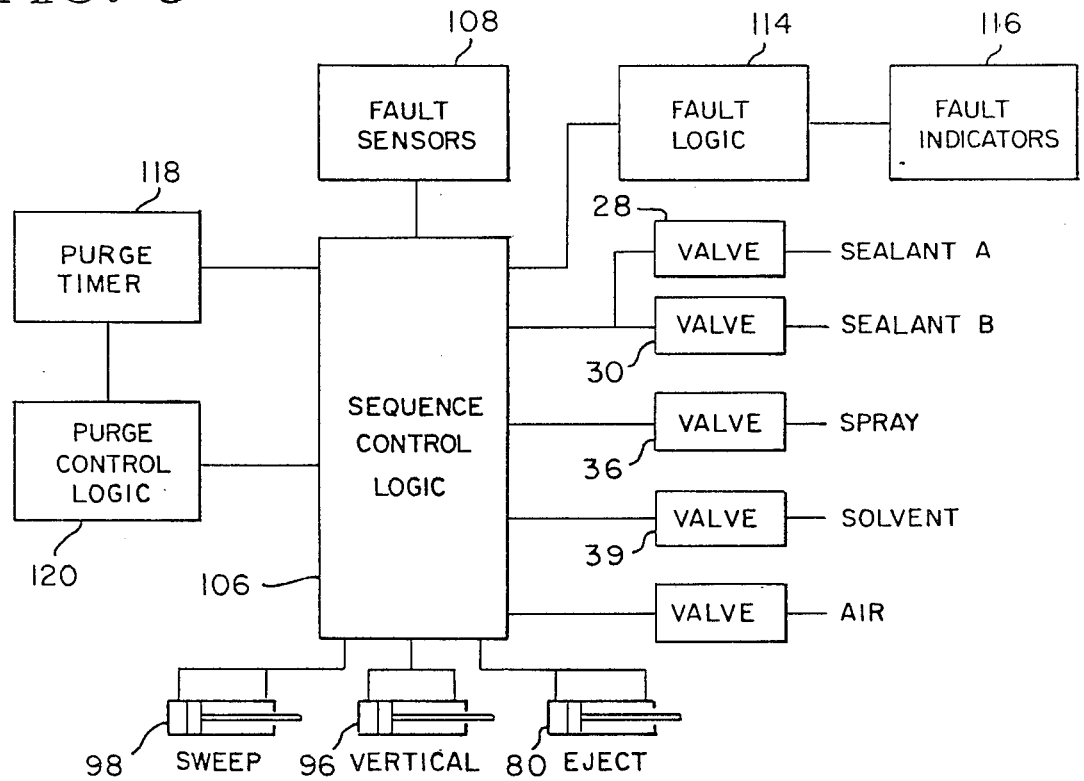
FIG. 6 is a schematic block diagram of the control system of the FIG. 1 applicator.
Figure 7:
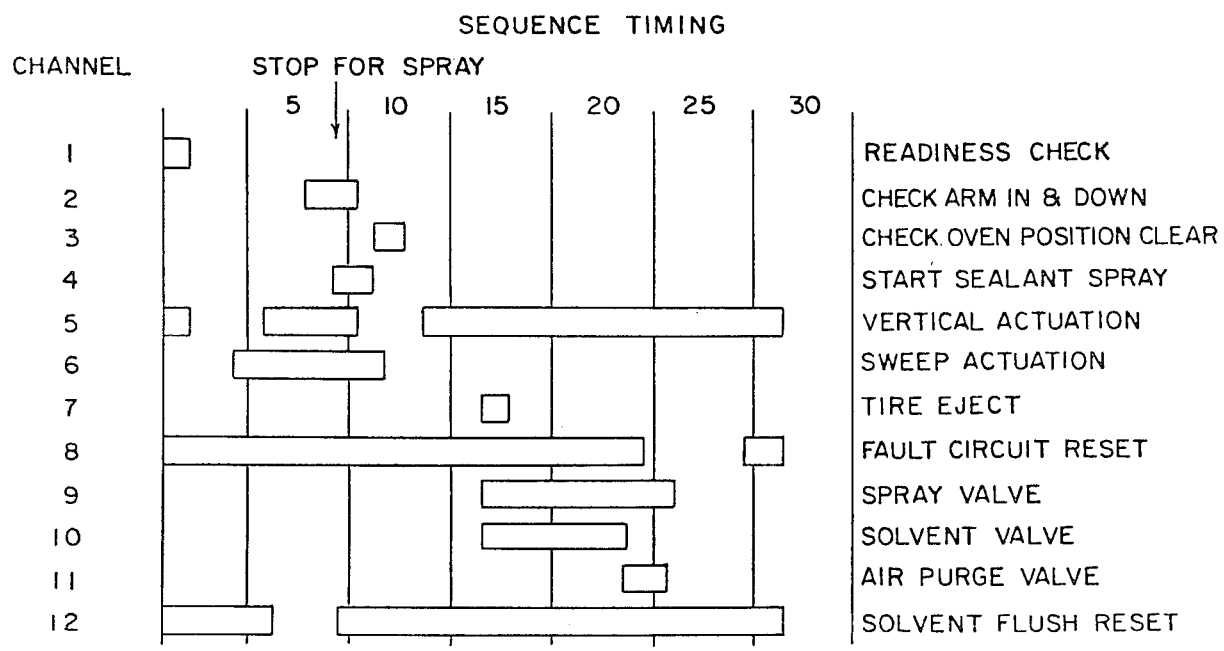
FIG. 7 is a timing diagram depicting operation of the FIG. 1 applicator.

Referring now to FIGS. 4A–4D, 6 and 7, the FIG. 1 spray applicator is automatically moved between the position illustrated in FIGS. 4A–4D by the automatic control system depicted schematically in FIGS. 6 and 7. Appropriate position sensors sense the position of the arm and carriage while additional sensors monitor other system conditions and produce appropriate fault indications, if necessary. The control system additionally effects automatic purge of the sealant system if a sealant application is not effected within a predetermined time period corresponding to the sealant gel time period. The control system depicted schematically in FIG. 6 is made up of conventional pneumatic and electrical components. Certain of the sensors depicted in FIG. 6 are illustrated in further detail in FIGS. 4A–4D, with the remaining sensors and other schematically represented control system components being illustrated generally in schematic block diagram form and described hereinafter.

The FIG. 6 control system includes a sequence control logic circuit which provides sequential multiple channel output signals at appropriate time intervals during the application and curing cycles, as depicted in FIG. 7. In the illustrated example, the sequence control logic circuit accomplishes one operational control cycle on a thirty (30) second basis, although the actual cycle time is somewhat longer than thirty (30) seconds due to a dwell time period during sealant application. Following is a brief description of the channel output signal logic functions effected by the sequence control logic circuit which will be further understood with reference to FIG. 7 of the drawings.

CHANNEL 1-FAULT TEST

The sequence control logic circuit 106 receives signals from appropriate system condition or fault sensors 108 during the time interval 0.0–1.5 seconds of the aforementioned sequence or cycle. In the example, circuit 106 receives and processes signals from sensors responsive to steam temperature, sealant temperature, sealant supply, spray applicator carriage position, spray applicator arm position, sealant B supply, solvent recovery air flow, and tire presence. Sensors responsive to carriage position and arm position are illustrated in further detail in FIGS. 4A–4D and are referenced respectively by numerals 110, 112. An additional sensor 115 (FIGS. 4A–4D) detects the presence of a fresh tire at the application station. If any of the aforementioned sensors present a fault indication, a fault logic circuit 114 is actuated in response to delivery of an appropriate logic signal from the sequence control logic circuit. The fault logic circuit in turn operates an appropriate fault indicator 116, or causes the FIG. 1 sealant valves 28, 30 and actuators to be de-energized, or both. At the same time, the sequence control logic circuit initiates an idle mode whereby no further control functions are effected until the fault condition is corrected. If the fault sensors all provide a no fault indication, the sequence control logic circuit proceeds to the remaining channels in sequence.

CHANNEL 2-ARM IN AND DOWN

The sequence control circuit, during the time period 6.25–9.0 seconds, repeats the aforementioned fault test with respect to sensor 110 to determine whether the spray applicator is in its lowered advanced application position of FIG. 4A. A fault indication at this point, indicative that the spray applicator is at some other position, will produce an appropriate fault indication and again cause the sequence control logic circuit to assume its idle mode.

CHANNEL 3-OVEN POSITION CLEAR

The sequence control logic circuit, during the time 9.75–11.25 seconds, receives logic signals from an appropriate sensor operatively associated with the post dry oven or heat apparatus (referenced 22 in FIG. 1) in order to determine whether the oven is clear to accept a tire for completion of sealant cure. If the logic signals from that sensor indicate that the oven is not clear to accept a fresh tire, the sequence control logic circuit will repeat the aforementioned fault indication and idle functions until the fault condition is corrected.

CHANNEL 4-START SEALANT SPRAY

The sequence control logic circuit 106 automatically assumes its idle mode at time 7.75 seconds and will remain in its idle mode until the sealant application process is completed, in the illustrated example after about thirty (30) seconds elapsed time. The circuit 106 now routes appropriate logic signals to valves 28, 30 which thereupon are opened to admit sealant components A and B into the chamber 34 (FIG. 1). Simultaneously therewith circuit 106 routes an appropriate logic signal to valve 36 which, when opened, allows the now-mixed sealant components A and B to be applied in spray form to the tire, as described previously.

CHANNEL 5-VERTICLE ACTUATION

Figure 4B:
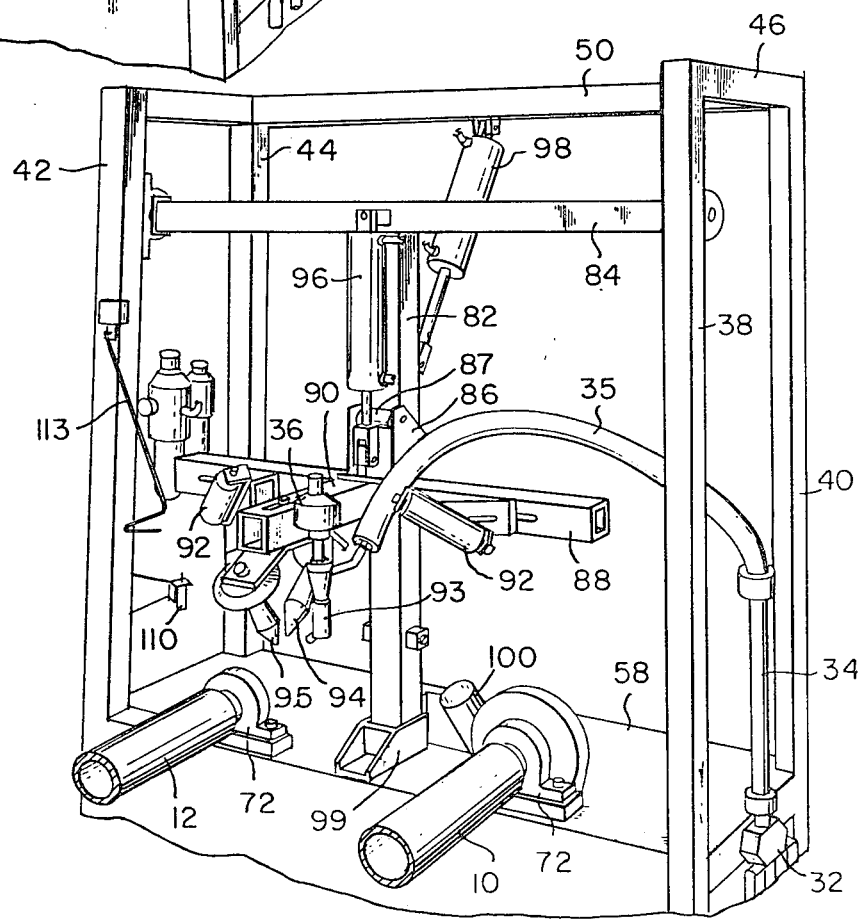
FIG. 4B is a fragmentary perspective generally similar to FIG. 4A, depicting the spray applicator in its raised advanced position.
Figure 4C:
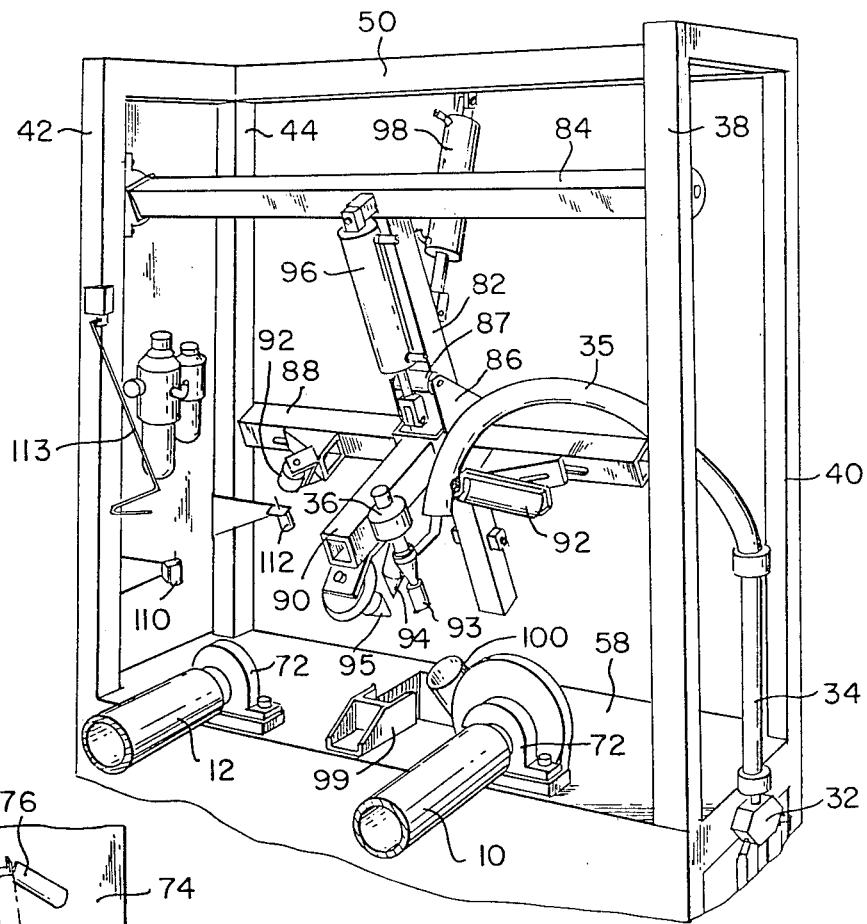
FIG. 4C is a fragmentary perspective generally similar to FIG. 4A, depicting the spray applicator in its raised retracted rest position.
Figure 4D:
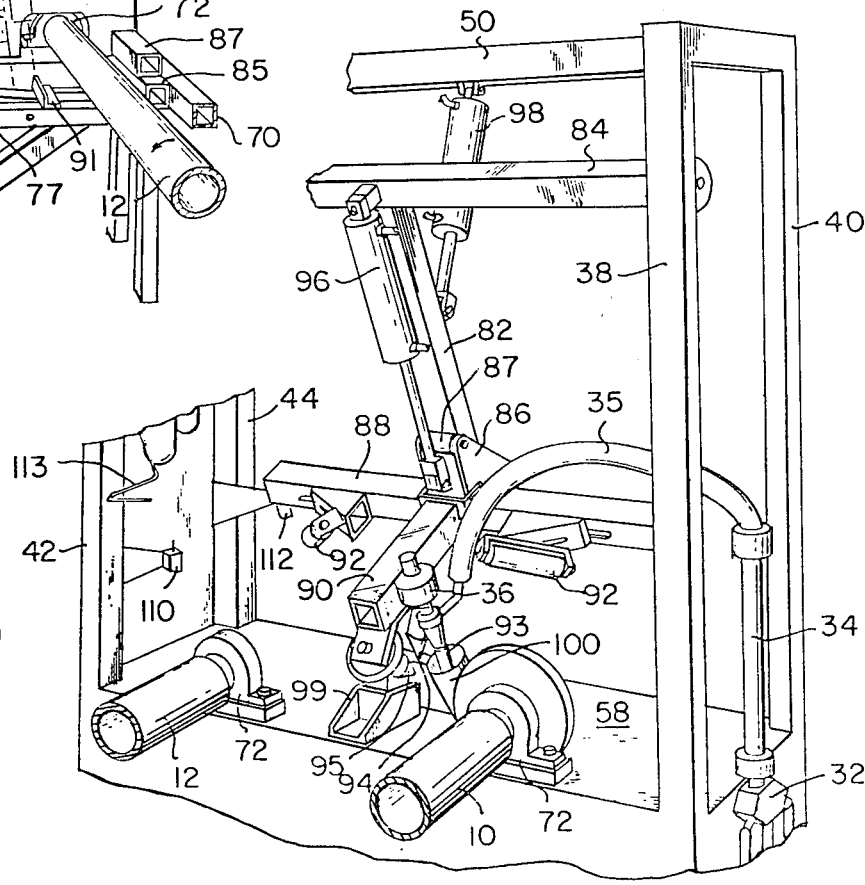
FIG. 4D is a fragmentary perspective generally similar to FIG. 4A, depicting the spray applicator in its lowered retracted purge position.

Upon completion of the spray application cycle, circuit 106 resumes sequencing and causes the carriage to be moved from its FIG. 4A position to its FIG. 4B position by appropriate actuation of cylinder 96.

CHANNEL 6-SWEEP ACTUATION

The circuit 106 now causes the spray applicator arm to swing from its 4B to 4C position by appropriate actuation of the sweep cylinder 98.

CHANNEL 7-TIRE EJECT

During the time period 15–16 seconds, circuit 106 causes the eject cylinder 80 to move the FIG. 5 kicker arm to its upright position in order to eject tire T10.

CHANNEL 8-FAULT CIRCUIT RESET

The circuit 106 now routes an appropriate reset logic signal to the fault logic circuit 114. The fault logic circuit alternatively may be reset by curing the fault condition, or manual reset by means not shown.

CHANNELS 9–12—PURGE

The circuit 106 further effects automatic purging of the sealant feed system by forcing solvent and then air through the manifold 32, mixing chamber 34, hose 35, valve 36 and nozzle 93 if sealant application is not effected within a predetermined time period after completion of the previous spraying cycle. In the example, this time period is less than the sealant gel time. Consequently, the channels 9–12 effect a purge operation only at machine shutdown or in the event of a mishap. A purge timer 118 is started each time sealant valves 28, 30 are opened and presents logic signals indicative of elapsed time from initiation of sealant application to a purge control logic circuit 120. This circuit in turn delivers appropriate logic signals to the sequence control logic circuit to effect operation of channels 9–12, as follows.

Channel 9 controls operation of the spray valve 36 (FIG. 4A) by opening that valve from time period 15–24.5 seconds.

Channel 10 controls operation of the FIG. 1 solvent valve 39 (FIG. 1) to allow solvent flushing of the system from an appropriate supply of solvent (not shown).

Channel 11 controls operation of air valve which delivers dry air for purging solvent from the system.

Channel 12 resets the FIG. 6 control system following purge after it has been established that all system faults are corrected and that the next operational step of the process will be that of sealant application. Operation of Channel 12 further causes an appropriate reset signal to be routed to the purge timer.

Although one preferred embodiment of the invention has been illustrated and described herein, variations will become apparent to one of ordinary skill in the art. Accordingly, the invention is not to be limited to the specific embodiment illustrated and described herein and the true scope and spirit of the invention are to be determined by reference to the appended claims.

The embodiments of the invention in which an exclusive property or privilege is claimed are defined as follows:

1. An apparatus for transporting a plurality of torroidal articles from a loading station to an unloading station while continuously rotating said articles, comprising:
   frame means;
   at least two generally parallel inclined elongated rollers rotatably mounted to said frame means for supporting a plurality of such articles in generally coaxial side-to-side relation;
   drive means for rotating at least one of said rollers;
   support means located at said unloading station for supporting one such article located at said unloading station against further displacement along said rollers;
   unloading means connected to said frame means and positioned at said unloading station for unloading one such article from said rollers while permitting continuous rotation of remaining articles supported by said rollers; whereby a plurality of said articles are rotated in place until such time as one such article is unloaded from the unloading station permitting the remaining articles to undulate along the rollers to successively occupy the location vacated by the preceding article.

2. The apparatus of claim 1 further including control means for actuating said unloading means at predetermined intervals.

3. The apparatus of claim 2 wherein said articles have been coated with a curable substance in flowable form and further comprising means for effecting gas flow along an axial passage formed by a plurality of such articles when supported in side-to-side relation by said apparatus.

4. The apparatus of claim 3 wherein the angle of inclination of said rollers is sufficient to prevent said articles from falling in a direction opposite to the direction of movement thereof.

5. The apparatus of claim 3 or 4 wherein said rollers rotate said articles at an angular velocity sufficient to maintain said fluid in position while said articles are rotated.

6. The apparatus of claim 5 wherein said unloading means and said support means are adjustable along a portion of the length of said rollers whereby said apparatus may be configured to accommodate changes in the number and width of articles to be transported and rotated.

7. The apparatus of claim 6 wherein said unloading means includes arm means pivotally connected to said frame means for lifting an article located at the unloading station in the direction of rotation of the upper surface of said rollers and over one of said rollers.

8. The apparatus of claim 1 wherein the incline of said rollers is approximately three degrees and said rollers are rotated at an angular velocity sufficient to cause said articles to rotate at from 30 to 40 rpm, inclusive.

* * * * *